United States Patent

Auld

[15] 3,649,855

[45] Mar. 14, 1972

[54] METHOD OF AND APPARATUS FOR OPTICALLY CONTROLLING PIEZOELECTRIC COUPLING

[72] Inventor: Bertram A. Auld, Menlo Park, Calif.

[73] Assignee: The Board of Trustees of Leland Stanford Junior University, Stanford, Calif.

[22] Filed: Mar. 6, 1970

[21] Appl. No.: 17,178

[52] U.S. Cl. ............................310/8.1, 250/211 R, 310/8.2, 333/30 R

[51] Int. Cl. ..........................................................H01v 7/00

[58] Field of Search........................310/8.1, 8.3, 8.8, 8.7, 9.5, 310/8.2, 8; 350/269; 250/211; 333/30

[56] References Cited

UNITED STATES PATENTS

| | | | |
|---|---|---|---|
| 3,412,269 | 11/1968 | Crittenden | 310/8.1 |
| 3,234,488 | 2/1966 | Fain | 333/30 |
| 3,346,816 | 10/1967 | Midford et al. | 333/30 X |
| 3,202,824 | 8/1965 | Yando | 250/211 |
| 3,183,359 | 5/1965 | White | 310/8.1 X |
| 2,308,360 | 1/1943 | Fair | 310/8.3 UX |
| 3,013,170 | 12/1961 | Sheldon | 310/8.1 X |

*Primary Examiner*—William M. Shoop, Jr.
*Assistant Examiner*—B. A. Reynolds
*Attorney*—Paul B. Fihe

[57] ABSTRACT

A method of and apparatus for controlling piezoelectric coupling by directing light in variable fashions against photoconductive material associated with a piezoelectric medium so that a modulation of the conversion of acoustical to electrical energy or vice versa is achieved.

12 Claims, 12 Drawing Figures

*INVENTOR.*
BERTRAM A. AULD

BY

Paul B. Fike

PATENT AGENT

INVENTOR.
BERTRAM A. AULD

BY

Paul B. Fike

PATENT AGENT

*INVENTOR.*
BERTRAM A. AULD
*BY* Paul B. Fihe
PATENT AGENT

METHOD OF AND APPARATUS FOR OPTICALLY CONTROLLING PIEZOELECTRIC COUPLING

FIELD OF THE INVENTION

The present invention relates generally to piezoelectric coupling and more particularly, to a method of and apparatus for optically controlling such coupling.

BACKGROUND OF THE INVENTION

The well-known piezoelectric effect providing for coupling of electric fields with acoustic waves has been greatly extended in its application in recent years. For example, electric excitation of a piezoelectric medium at microwave frequencies where wavelength varies from several microns to a fraction of a micron provides for substantial improvements in imaging over conventional low-frequency ultrasonic devices and leads theoretically to the consideration of the use of acoustic beams for microscopes for biological applications and materials flaw detection. More particularly, if one can operate in the microwave frequency region, imaging can have excellent resolution and a contrast sensitivity four orders of magnitude superior to optical instruments. This would mean, for example, in the counting of biological particles in blood tests, that particles could be detected which would be lost in the "noise" of an optical instrument.

Currently, commercially available ultrasonic image tubes provide an acoustic image on a thin piezoelectric plate which, in turn, provides a corresponding pattern of electric charge which is read off by scanning the back of the plate with an electron beam and presenting the image as a TV picture. Two very practical difficulties exist both related to the necessity for the electron beam scanning, first, to permit operation of the electron beam, the back of the plate must be evacuated, and second, the electron beam itself introduces "shot noise" into the detected signal thus limiting practical sensitivity of the device.

SUMMARY OF THE INVENTION

It is accordingly a general objective of the present invention to provide a method of and apparatus for optical control of piezoelectric coupling in a piezoelectric medium and, by way of example, provide for optical scanning of the medium for purposes of acoustic image formation.

Briefly, such control is enabled through utilization of the well-established characteristics of piezoelectric and photoconductive materials. If the electric field in and around a piezoelectric material is altered, the piezoelectric coupling between the acoustic waves and connected electrical circuitry is varied. In turn, the well-known photoconductive effect provides for a change in conductivity due to the action of incident illumination.

Accordingly, if a photoconductor is associated with a piezoelectric material sample in an appropriate fashion, illumination of the photoconductor will change its conductivity and the resultant electric field distribution in and around the piezoelectric sample thus to control the piezoelectric coupling in a manner which varies with the space, time, and magnitude of the illumination.

In very broad terms, the method of the present invention involves the steps of associating a photoconductive material with a piezoelectric medium and directing light with variations in space, time or magnitude against the photoconductive material to modify the electric field distribution in and around the associated piezoelectric medium thus to vary the coupling in accordance with the variations in the incident illumination. It is to be expressly understood that the term "light" as utilized hereinabove is not limited to visible light but to any radiation to which a photoconductive material does respond.

Whereas as indicated above, a photoconductor which is not piezoelectric may be associated with a separate piezoelectric material which, in turn, is nonphotoconductive, it is well known that certain materials have both photoconductive and piezoelectric characteristics, common examples being CdS, CdSe, ZnO, ZnS. By way of explanation, if a CdS film longitudinal wave transducer is mounted on a single crystal sapphire rod, the impedance of the transducer is represented by an equivalent parallel RC circuit in series with a capacitance which represents the fringing electric field in the sapphire crystal and illumination against the film in effect changes the value of R thereby changing the field strength in the film and the resultant piezoelectric coupling.

Accordingly, by way of example, if microwave frequency electrical energy is appropriately applied to the CdS film on the sapphire rod, an acoustic beam is generated and is propagated through the rod and subsequent variations in application of light to the CdS will, in turn, effect variations in the acoustic beam as will be explained in detail hereinafter. Alternately, if the CdS film is utilized as a receiving rather than an acoustic transmitting transducer, application of light to the film will, in turn, effect the conversion of acoustic to electrical energy.

These optical controls of a transmitting or receiving transducer are to be recognized as mere exemplary uses of the optical control method broadly recited hereinabove and many applications will suggest themselves such as acoustic shadow imaging, three-dimensional scan imaging, acoustic standing wave detection and acoustic grating filters as well as many others employing the same general principle as will become more apparent from the detailed description of such general method taken alone or accompanied by additional steps for particular applications.

BRIEF DESCRIPTION OF THE DRAWINGS

The stated objective of the invention and the manner in which it is carried out will be more readily understood by reference to the following detailed description of the exemplary structures shown in the accompanying drawings wherein.

DETAILED DESCRIPTION OF THE EXEMPLARY EMBODIMENTS OF THE INVENTION

A simple and basic acoustic transmitting transducer for bulk or volume waves conventionally includes a disc of some piezoeelectric material which is placed in contact with an acoustic propagation medium and the structure is appropriately associated with electric fields in a manner to penetrate the piezoelectric medium and, as a result of the piezoelectric effect, generate compressional and/or shear stresses in the material which excite the acoustic waves.

Figure 1:
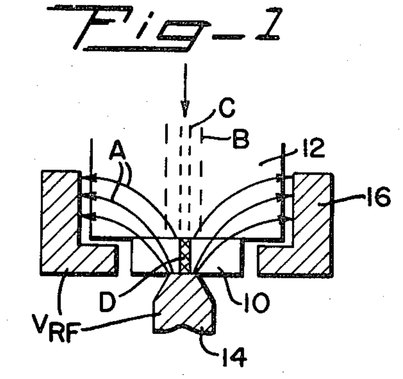
FIG. 1 is a diagrammatic central sectional view of a transmitting transducer utilizing the method of the present invention.

In accordance with the present invention as illustrated in FIG. 1, the piezoelectric transducer disc 10 is formed from material which also constitutes a photoconductive material, CdS and ZnS being examples of materials which have both the piezoelectric and photoconductive effects. One surface of the illustrated disc is placed in direct central contact with a propagation medium which can constitute a sapphire rod 12 capable of propagating an acoustic beam generated by the application of electric fields. In practice, the piezoelectric photoconductive disc 10 can readily be formed by deposit of a thin film of the CdS or ZnS on the one end of the sapphire rod 12 in accordance with known techniques and dimensioned in accordance with the desired operating frequencies well established in the art. For example, if the CdS is to be excited by electric fields at a frequency of 1.5 GHz., a film thickness of approximately 1.27 microns is appropriate.

In order to excite the transmitting transducer 10 as described hereinabove, a conventional coaxial mount can be utilized including a central electrode 14 placed against the center of the film transducer 10 opposite to the surface of the sapphire rod 12 and an annular electrode 16 surrounding the film disc so that upon application of electrical (microwave) energy $V_{RF}$ electric fields are generated as instantaneously indicated by the arrows A. Upon application of the electrical energy an acoustic beam whose exterior diameter is indicated by the dashed lines B is generated and is propagated upwardly as shown in FIG. 1.

The structure and its functioning in generating an acoustic beam as thus far described is substantially conventional with the exception that the piezoelectric material is chosen so as to exhibit the photoconductive effect utilized in carrying out the method of the present invention.

In accordance with such method, a beam of light from a suitable source is directed through the sapphire rod 12 to the upper surface of the film disc transducer 10 and, as specifically shown in FIG. 1, the light is in the form of a narrow pencillike beam directed centrally against the film transducer, the outer limits of the beam being defined by the dashed lines indicated at C and completely contained within the central portion of the acoustic beam defined by the dashed lines B. Accordingly, the film transducer 10 is engaged by the beam of light C in the central area indicated by the crosshatching at D so that in this area because of the photoconductive nature of the film transducer, its resistance value will be decreased so that its conductivity will, in turn, be increased wherefore a decrease in the electric field in this area will be produced to result in decreased acoustic excitation. Accordingly, a "hole" will be introduced into the acoustic beam having the same dimensions as the incident light beam, the surrounding annular portion of the acoustic beam B remaining unaffected.

If the incident illumination provides a "dark spot" rather than increased light intensity in the center of the film transducer, the reverse effect occurs, the acoustic excitation in this area relatively increasing and that in the surrounding annular portions of the acoustic beam being relatively decreased. Accordingly, by providing either a "light spot" or a "dark spot" within the generated acoustic beam, either a "hole" or negative beam in the existing acoustic beam can be generated or a positive beam of acoustic energy can be produced.

In either case, if the beam of light C is shifted transversely, the light or dark spot is, in turn, moved and the generated acoustic hole or beam is shifted laterally thus to provide a scanning of the acoustic beam or hole. In addition, if through appropriate optical focusing, the size of the spot is increased or decreased, a corresponding increase or decrease in the acoustic beam or hole size is automatically produced. Finally, it will be observed that if the intensity of the light is varied, greater or lesser resistance through the photoconductive effect will be produced and a resultant variation in the acoustic excitation will occur to ultimately effect propagation of an acoustic beam or hole of variant acoustic strength or weakness as the case may be. As an extension of the latter effect, it will be obvious that if the light beam C is pulsed intermittently, corresponding pulses in the acoustic hole or beam will be effected. Thus, in summary, variations of the light in terms of space, time, or magnitude will effect corresponding variations in the propagated acoustic energy.

Figure 2:
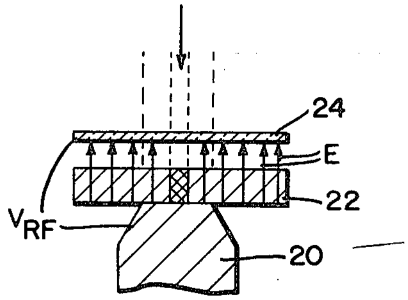
FIG. 2 is a fragmentary diagrammatic view of a slightly modified transmitting transducer generally similar to FIG. 1 in its arrangement, but arranged to have a different electric field distribution.

Many variations in the production of the acoustic hole or beam can be readily envisioned. As one example, it being recognized that the transducer 10 shown in FIG. 1 and described above is not extremely efficient because the electric field is not confined to the piezoelectric transducer, a modified and more effective arrangement can be produced if, as shown in FIG. 2, a similar central electrode 20 is placed adjacent the undersurface of a film transducer 22 but the second annular electrode of FIG. 1 is replaced by a slightly spaced thin transparent upper electrode 24 so that the instantaneous electric fields, generated by application of voltage across the electrodes, are in direct parallelism through the film transducer 22 as shown by the arrows E in FIG. 2. Such transparent upper electrode 24 can be formed from any material which is light transparent and also electrically conductive, typical examples being cadmium oxide and tin oxide. Consequently, a beam of light indicated by the arrow in FIG. 2 can be directed against the transducer 22 through the transparent electrode 24 to provide a negative (hole) or positive acoustic beam in a similar manner.

Figure 3:
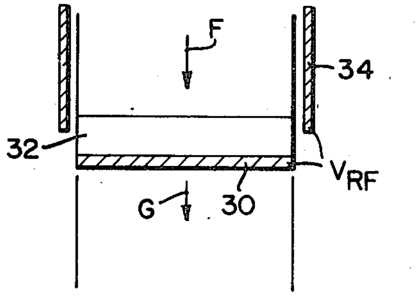
FIGS. 3 and 4 are views similar to FIGS. 1 and 2 but modified in that illumination is applied to the piezoelectric material from the back of the transducer.
Figure 4:
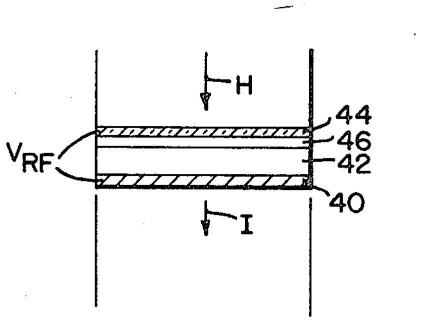

In both embodiments of the invention described in connection with FIGS. 1 and 2, the acoustic beam or hole is seen to emanate from the same side of the transducer as the incident illumination. FIGS. 3 and 4 constitute modified embodiments providing for illumination of the film transducer from one surface and radiation of the acoustic beam or hole from the opposite surface. More particularly, FIG. 3 corresponds otherwise with FIG. 1 including a central electrode 30 disposed adjacent the lower face of the photoconductive piezoelectric transducer 32 and an annular electrode 34 disposed laterally outwardly therefrom so as to create electric fields generally similar in configuration to those shown in FIG. 1. The light beam F is directed downwardly from the top of the transducer 32 and an acoustic propagating means which can constitute a solid such as a sapphire rod or any other known liquid, solid or gaseous acoustic propagating medium can be positioned below the central electrode 30 so that the acoustic beam or hole generated by the incident illumination will be propagated downwardly; in the direction of the arrow G.

In turn, FIG. 4 has an electrode configuration similar to FIG. 2 including a metal electrode 40 below the transducer 42 and an upper transparent electrode 44 of cadmium oxide or tin oxide, by way of example, thereabove and insulated from the transducer 42 itself by a nonphotoconducting dielectric layer 46. The incident illumination H is again directed against the transducer 42 through the transparent electrode 44 and dielectric 46 from above and the acoustic beam or hole is, in turn, delivered downwardly through an acoustic propagating medium of liquid, solid, or gaseous form disposed below the transducer.

In all of these first four embodiments of the invention, the film transducer was composed of CdS or other material which exhibits both photoconductive and piezoelectric effects. In the general statement of the method of the invention as given hereinabove, the term "associating" is intended to encompass a choice of material which is both photoconductive and piezoelectric as integral characteristic of a single material. However, the term "associated" is to be construed more broadly so as to include the placement of a photoconductive, nonpiezoelectric material adjacent a piezoelectric, nonphotoconductive material in a fashion so that when the conductivity of the photoconductive material is changed by incident illumination, the electric fields in the adjoining piezoelectric medium are disturbed so as to produce an acoustic beam or hole in a fashion substantially identical to that described hereinabove where the transducer was composed of material having both photoconductive and piezoelectric characteristics.

Figure 5:
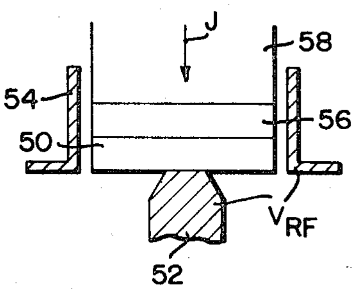
FIG. 5 is a view similar to each of FIGS. 1–4 but indicating a transmitting transducer wherein separate photoconductive and piezoelectric materials are utilized.

By way of specific example, FIG. 5 diagrammatically shows a structural arrangement substantially similar to FIG. 1 including a nonphotoconducting piezoelectric disc or transducer 50 having one electrode 52 centrally adjacent its lower surface and an annular electrode 54 in surrounding relationship so as to establish electric fields similar to those illustrated in FIG. 1 and the piezoelectric disc 50 is, in turn, engaged on its upper surface by a nonpiezoelectric photoconductive disc 56 against which the illumination is delivered from above through a sapphire rod 58 as indicated by the arrow J. When such illumination is delivered to the photoconductor 56, the fields in the adjoining piezoelectric disc 50 are disturbed so that an acoustic beam or hole is delivered upwardly through the sapphire rod 58 or other acoustic propagating structure.

Figure 6:
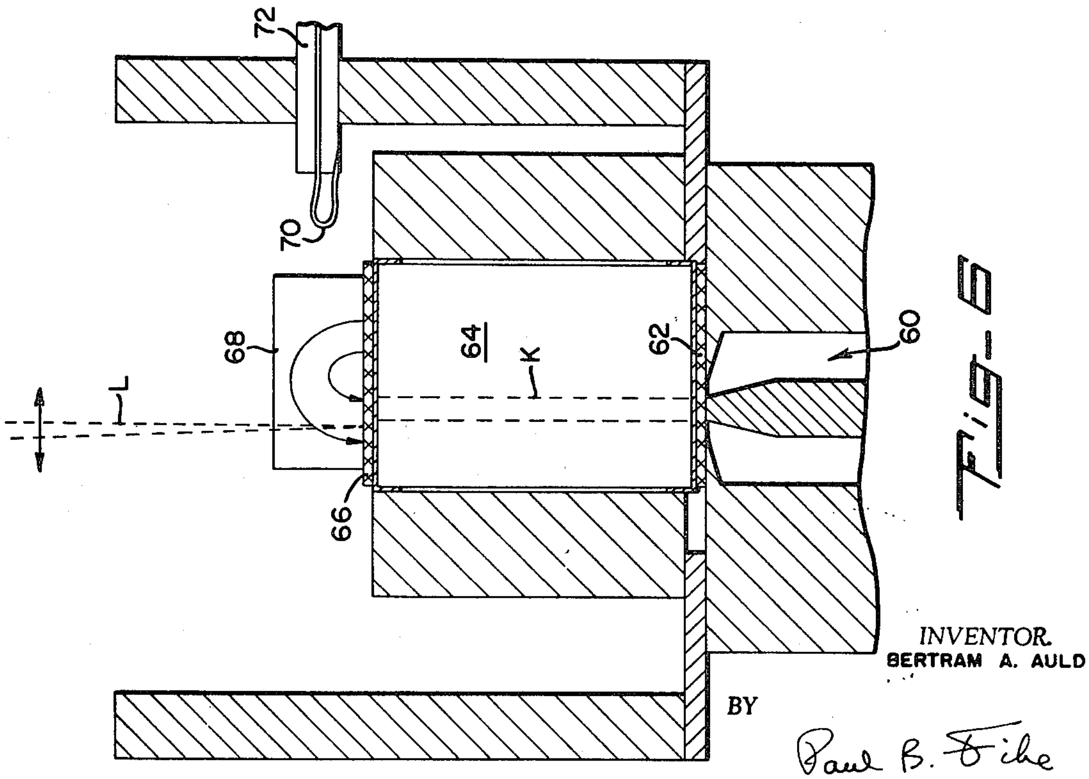
FIG. 6 is a more detailed central sectional view illustrating the optical scanning of a receiving transducer embodying the invention.

In all of the first five described embodiments of the invention, it will be apparent that the incident illumination can be in the form of a beam having very small dimension, for example, in the neighborhood of 1 micron, and, in turn, the acoustic beam or hole produced in the transmitted acoustic energy can be of similar dimensions enabling acoustic sensing of very minute areas for the various applications of the described structures as indicated briefly hereinabove and as will be described in more detail hereinafter. In particular, the light beam can be moved without employment of any mechanically moving parts over the entire area of a transducer thus to provide a precise acoustic scanning mechanism which can be applied either to the transmitting transducers of the type described hereinabove or to a receiving transducer in a manner shown in detail in FIG. 6.

Figure 7:
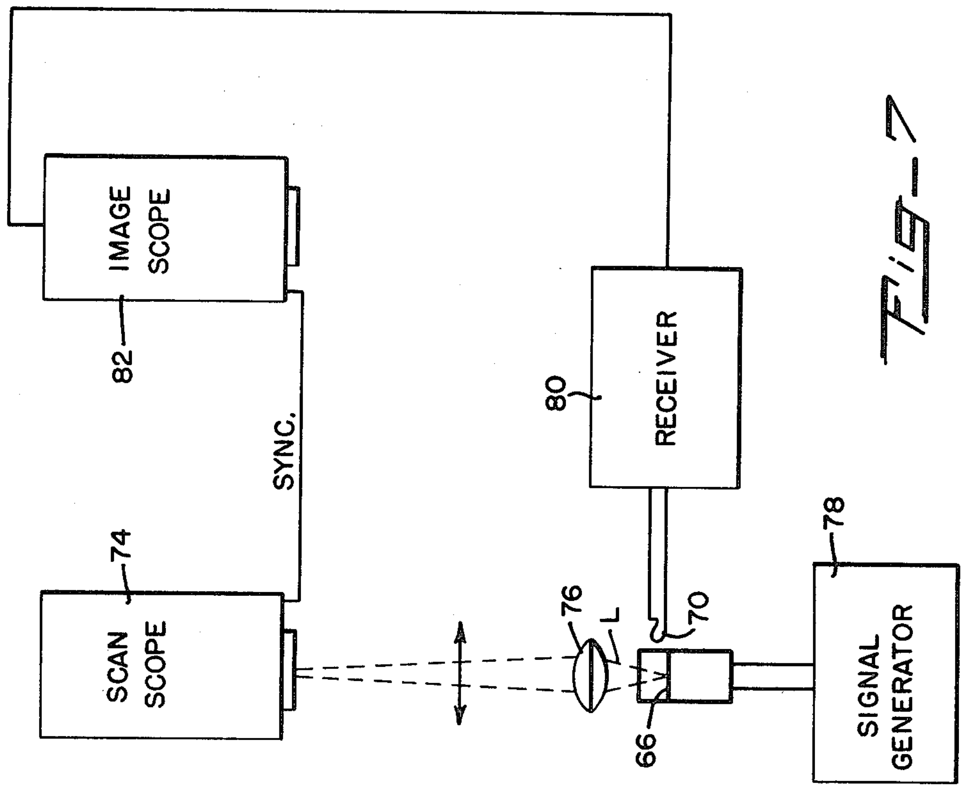
FIG. 7 is a block diagram showing the associated circuitry of a complete system incorporating the transducer of FIG. 6.

With specific reference to the latter figure, an acoustic beam K is generated by a standard coaxial mount 60 of a transmitting transducer indicated at generally 62 and the resultant acoustic beam is directed upwardly through a propagating sapphire rod 64 to a receiving transducer 66 against which a focused light beam can be directed as indicated at L through a $SrTiO_3$ resonator 68 whose output is coupled by a standard loop 70 to an output coaxial line 72. The beam of light is generated by a "flying spot" scanner 74 which may constitute the output from the screen of a Tektronix 531 oscilloscope. The light spot is focused as shown in FIG. 7 by a simple lens 76 to provide a small spot, for example, having a dimension at the surface of the receiving transducer 66 in FIG. 6 of several microns. As the spot is moved across the surface of the receiving transducer 66, no variation in output is observed until the spot intercepts the area of the receiving transducer in the path of the acoustic beam K.

As shown in the block diagram of FIG. 7, the input signal is delivered to the transmitting transducer from a microwave signal generator 78 and as the light spot L intercepts the acoustic beam K on the receiving transducer 66, the variation in the acoustic to electric energy interchange is detected by the loop coupler 70 and delivered to a receiver 80 which is connected to modulate a second oscilloscope 82 which is synchronized with the scanning oscilloscope 74, thus ultimately providing a visual signal.

If some object is placed between transmitting and receiving transducers 62, 66, for example, in a liquid cell interposed between the transmitting and receiving transducers, the object may be detected and this mechanism can obviously be used for realizing a scanning acoustic microscope at kilomegacycle frequencies or, for example, for many other applications such as detecting flaws in opaque materials. Such detection mechanism, which can be denominated as "shadow" imaging, can be explained more readily by reference to the diagrammatic representation of FIG. 8 wherein an object M is disposed between a transmitting transducer 90 and a receiving transducer 92 which may be of the type specifically described in connection with FIG. 6. The main acoustic beam produced by the transmitting transducer 90 passes to the receiving transducer 92 but is shadowed by the object so as to create a hole N in the beam transmitted past the object to the receiving transducer. If, in turn, a movable hole O is generated in the acoustic beam through focusing of a movable light spot on either the receiving or transmitting transducer 90, 92, the actual effect being equivalent because of the reciprocity of antenna structures, no change in the output electrical signal is observed as long as this scanning hole O does not overlap with the shadow hole N generated by the object. However, when the scanning hole O is moved into an intercepting position with the object, the two holes N, O now overlap and the output signal is proportionately increased, the maximum increase occuring when the scanning hole O is entirely intercepted by the object so that only the shadow hole N impinges on the receiving transducer. By appropriate electrical filtering, the steady-state signal can be removed so that only an output signal will be generated when the two holes are in partial or full coincident positions.

Figure 8:
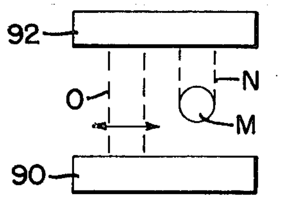
FIG. 8 is a diagrammatic view of a unit embodying the present invention to provide a "shadow" acoustic image.

Whereas the shadow imaging arrangement shown in FIG. 8 and described immediately hereinabove provides for acoustic imaging of an object between separate transmitting and receiving transducers, any of the transmitting transducers described in connection with FIGS. 1 through 5 inclusive can be utilized to project a scanned acoustic beam (hole) against an exterior object which will, as a result of "sonarlike" reflections against the transducer, be similarly capable of detection. The described scanning mechanisms in those Figures were essentially two-dimensional and with but a simple modification, a three-dimensional scan can be provided as shown in FIG. 9 to enable, for example, detection of interior flaws in opaque materials or interior biological variations in a human body.

Figure 9:
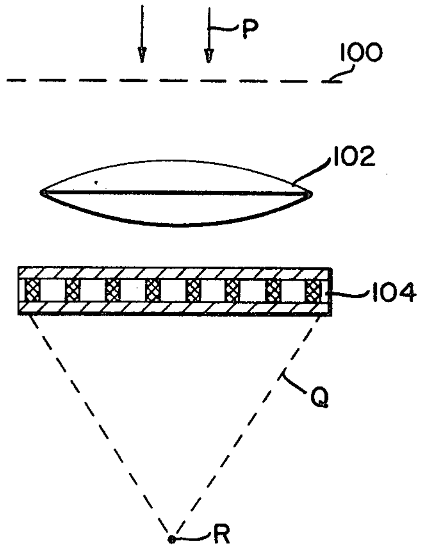
FIG. 9 is a diagrammatic view illustrating yet a further modified embodiment of the invention which provides a three-dimensional acoustic scanning mechanism.

The FIG. 9 arrangement essentially utilizes the method of the present invention in one specific form to provide for focusing of acoustic energy in a fashion similar to the well known Fresnel zone plate technique utilized for focusing optical energy (see, for example, F. A. Jenkins and H. E. White, "Fundamentals of Optics," pp. 355–356, McGraw Hill, 1950). Very briefly, an optical Fresnel zone plate utilizes a special screen that is designed to block off the light from circular ringlike zones having appropriate areas and radii. If such zone plate is illuminated uniformly from behind, optical diffraction by the circular rings or zones produces a bright spot of light at a point in front of the plate, the focal length being determined by the size of the rings and the optical wavelength of the incident illumination. Thus, the Fresnel zone plate constitutes a form of optical lens.

An analogous arrangement embodying the method of the present invention is diagrammatically illustrated in FIG. 9, where incident illumination indicated at P is delivered downwardly through a mask 100 having a circular pattern and thence through an appropriate optical imaging system indicated diagrammatically by the lens 102 to direct the light in a circular pattern onto an acoustic transmitting transducer 104 which may be any of the types described in connection with FIGS. 1 through 5. Circular, ringlike zones of light are accordingly projected onto the photoconductive piezoelectric transducer 104 to appropriately modify the piezoelectric coupling thus to generate an acoustic output in the form of a convergent acoustic beam indicated at Q which is focused at a distant point R. If the light imaging system 102 is varied to change the disposition of the circular light rings on the transducer 104 the amount of convergence and the disposition of the focal point is varied in its distance from the transducer.

Accordingly, if by way of example, the unit as diagrammatically indicated in FIG. 9, is physically displaced across the surface of an opaque material, so long as such material is internally consistent, no variation in the reflected acoustic energy will be observed through, for example, coupling of a suitable electrovisual display system as shown in FIG. 7 to the transducer 104. However, if an internal inconsistency flaw in the material occurs, the reflected signal will vary to indicate in a two-dimensional plane that a material flaw does exist. In turn, by appropriate adjustment of the optical imaging system 102, the acoustic focal point R can be shifted in its third dimension disposition, and a maximum signal will be obtained when the focal point coincides with the interior material flaw. Accordingly, a very precise and nondestructive location of the material flaw is provided. In a generally similar fashion, the same procedure will enable three-dimensional acoustic detection of biological information.

Figure 10:
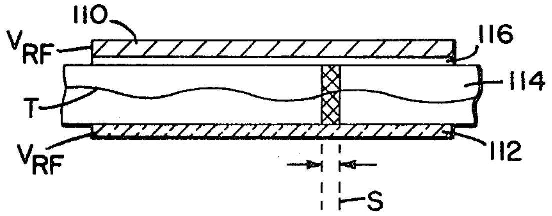
FIG. 10 is a diagrammatic view of an acoustic wave detector embodying the invention.

Other acoustic applications of the method of the present invention analogous to known electromagnetic methods will suggest themselves to those skilled in the art. As one example, an acoustic analogy of the electromagnetic slotted line which provides a movable probe along the line to determine electric field distribution can easily be provided as diagrammatically illustrated in FIG. 10 wherein two electrodes 110 and 112 are disposed respectively above and below a photoconducting piezoelectric plate 114 on which an acoustic wave T is established. The upper electrode 110 is separated from the plate by a dielectric layer 116 and the lower electrode 112 is rendered transparent so that a light beam indicated at S can be directed against the entire transducer and can be shifted therealong as indicated by the arrows thus to provide a shifting "hole" in the transducer in the region which is illuminated. An electrical receiver (not shown) is connected across the electrodes 110, 112 and the amount of acoustic energy subtracted by the "hole" resulting from the incident illumination will vary depending upon the acoustic field at the instantaneous position of the light beam. Since, as previously indicated the light beam S can be focused down to a width as small as 1 micron, the described structure can be used as a slotted acoustic line for frequencies up to 100 mc./sec..

Figure 11:
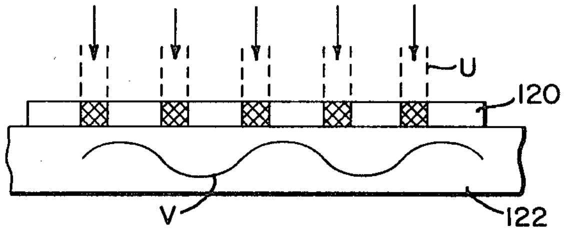
FIG. 11 is yet another diagrammatic view showing an acoustic grating filter embodying the concepts of the invention.

Another particularly useful application of the method of the present invention provides for the simple construction of a constructive interference filter which is quite simply tuned by varying the light application. A diagrammatic structure is shown in FIG. 11 wherein a photoconductive piezoelectric film 120 is placed adjacent an acoustic propagating plate 122 along which an acoustic wave V of a particular frequency is transmitted. A sequence of strips of light U are directed against the photoconductive piezoelectric film 120 in a pattern which separates the strips of light by one-half the acoustic wavelength and accordingly provides regions in the sample of lesser and greater conductivity so that the electric fields in the photoconductive piezoelectric film generated by the neighboring acoustic waves are periodically variable and, in turn, induce acoustic reflections in the acoustic propagating structure 122. Since the light beams are positioned one-half acoustic wavelength apart, the reflections have a full periodicity of 1 wavelength thus to provide constructive interference and consequent filtering of the acoustic energy at a wavelength or frequency dependent entirely upon the spacing of the incident strips of illumination.

Figure 12:
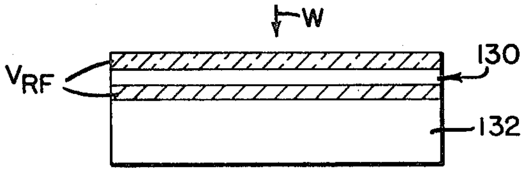
FIG. 12 is a further diagrammatic view utilizing the invention to vary coupling to an acoustic resonator.

As an additional control mechanism, a piezoelectric transducer 130 as illustrated in FIG. 12 can be positioned adjacent an acoustic resonator diagrammatically indicated at 132 and a variation in the incident illumination W upon the transducer will automatically vary the coupling into the resonator. For example, the amount of loss coupled into the resonator 132 can be varied thus to change its operating bandwidth.

While a variety of structures embodying the present invention have been described, it will be apparent that many others will suggest themselves automatically to those skilled in the art and the foregoing description of several embodiments is accordingly to be considered only as representative and not in a limiting sense and the actual scope of the invention is to be indicated by reference to the appended claims.

What is claimed is:

1. The method of optically controlling piezoelectric coupling which comprises the steps of
 associating a photoconductive material with a piezoelectric medium,
 establishing acoustic energy in said piezoelectric medium, and
 directing light with variations in space, time, or magnitude against said photoconductive material to modify the electric field distribution in and around the associated piezoelectric medium, thus to vary the coupling between the established acoustic energy and electrical energy in the piezoelectric medium,
 the directed light being in the form of a beam moved across the photoconductive material in a predetermined fashion.

2. The method of claim 1 which comprises the steps of,
 applying electrical energy to the piezoelectric medium to generate acoustic energy, and
 the light is scanned in the form of a narrow beam across the photoconductive medium to establish an acoustic beam.

3. The method of claim 2 wherein,
 the light beam is more intense than the surrounding light to produce a negative acoustic beam (hole).

4. The method of claim 2 wherein,
 the light beam is less intense than the surrounding light to produce a positive acoustic beam.

5. The method of claim 2 which comprises the additional step of,
 scanning the acoustic beam across an object to effect acoustic sensing thereof.

6. The method of optically controlling piezoelectric coupling which comprises the steps of,
 associating a photoconductive material with a piezoelectric medium,
 establishing acoustic energy in said piezoelectric medium,
 directing light with variations in space, time, or magnitude against said photoconductive material to modify the electric field distribution in and around the associated piezoelectric medium, thus to vary the coupling between the established acoustic energy and electrical energy in the piezoelectric medium, and
 moving the light in the form of a beam along the photoconductive material to sense the acoustic energy at the position of illumination.

7. The method of optically controlling piezoelectric coupling which comprises the steps of,
 associating a photoconductive material with a piezoelectric medium,
 establishing acoustic energy in said piezoelectric medium, and
 directing light with variations in space, time, or magnitude against said photoconductive material to modify the electric field distribution in and around the associated piezoelectric medium, thus to vary the coupling between the established acoustic energy and electrical energy in the piezoelectric medium, the acoustic energy being established by applying electrical energy to the piezoelectric medium, the light being directed in a pattern having the form of a series of circular rings which effect focusing of the acoustic energy.

8. The method of claim 7 which comprises the additional step of,
 varying the circular ring pattern of light to vary the acoustic focal point.

9. The method of optically controlling piezoelectric coupling which comprises the steps of,
 associating a photoconductive material with a piezoelectric medium,
 establishing acoustic energy in said piezoelectric medium, and directing light with variations in space, time, or magnitude against said photoconductive material to modify the electric field distribution in and around the associated piezoelectric medium, thus to vary the coupling between the established acoustic energy and electrical energy in the piezoelectric medium,
 generating electric energy in the piezoelectric material by placing an acoustic propagating structure thereagainst and
 directing the light in a linear separated pattern of one-half a predetermined acoustic wavelength against the photoconductive medium thus to create a constructive interference pattern at a predetermined acoustic frequency.

10. Optical control apparatus for piezoelectric coupling which comprises, a photoconductive, piezoelectric transducer, means for applying electric fields to said transducer to generate acoustic energy, means for directing a beam of light against said transducer to vary the piezoelectric coupling and control the acoustic output, and means for scanning the beam of light across the transducer.

11. Optical control apparatus for piezoelectric coupling which comprises, a photoconductive, piezoelectric transducer, means for applying electric fields to said transducer to generate acoustic energy, means for directing light against said transducer to vary the piezoelectric coupling and control the acoustic output, and a mask having a light-transmitting pattern in the form of a sequence of circular rings disposed between said light directing means and said transducer.

12. Optical control apparatus according to claim 11 which comprises, an optical imaging system between said mask and said transducer to vary the dimensions of the circular ring light pattern on said transducer.

* * * * *